Inventor:
John Farmer
By Wilmer Mechlin
his Attorney ary are mounted on a suitable supporting stand 28
United States Patent Office 3,450,178
Patented June 17, 1969

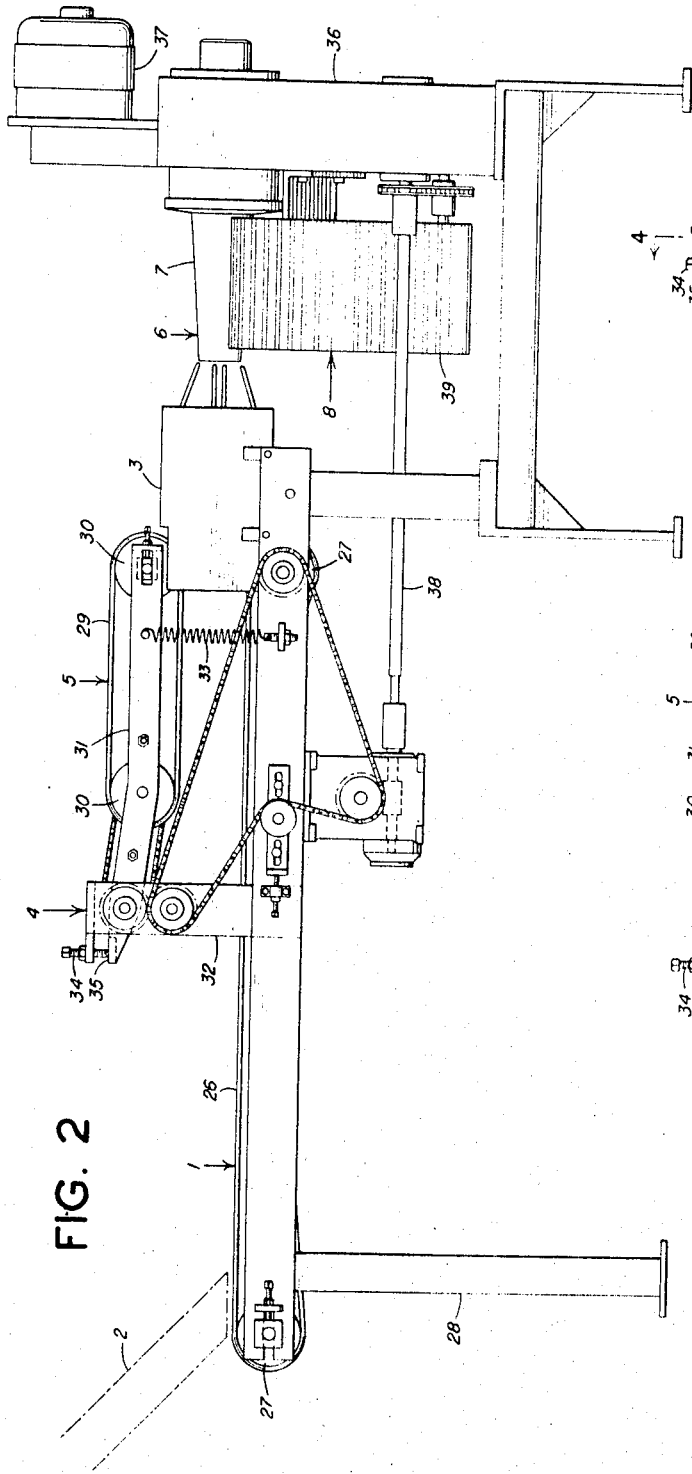
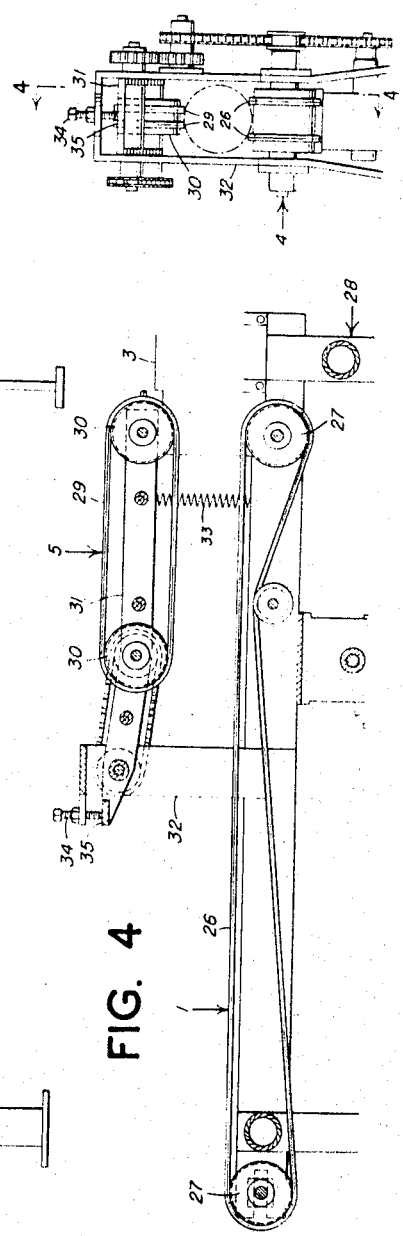
FIG. 2
FIG. 3
FIG. 4
Inventor
John Farmer
By Wilmer Mechlin
his Attorney June 17, 1969 J. FARMER 3,450,178
PINEAPPLE SIZING APPARATUS
Original Filed Sept. 29, 1961 Sheet 3 of 3

3,450,178
PINEAPPLE SIZING APPARATUS
John Farmer, Honolulu, Hawaii, assignor, by mesne assignments, to Ward Foods, Inc., New York, N.Y., a corporation of New York
Original application Sept. 29, 1961, Ser. No. 141,680, now Patent No. 3,246,678, dated Apr. 19, 1966. Divided and this application Oct. 23, 1965, Ser. No. 503,856
Int. Cl. A23n 15/00, 7/00
U.S. Cl. 146—6      4 Claims

ABSTRACT OF THE DISCLOSURE

Pineapple sizing apparatus having a rotary sizing knife and shell eradicator and feeding pineapples endwise through a centering device to the knife by vertically aligned and spaced pairs of laterally spaced belts, one pair supporting the pineapples endwise against lateral displacement and the other cooperating therewith for gripping and positively feeding the pineapples.

---

This invention relates generally to pineapple processing apparatus and particularly to apparatus for sizing pineaples. This application is a division of my copending application Ser. No. 141,680, filed Sept. 29, 1961, now patent No. 3,246,678, issued Apr. 19, 1966.

While attempted somewhat earlier, the mass production of canned pineapples actually began around 1914 with the introduction of the Ginaca machine or "Ginaca," as it is sometimes called. Although improvements have been made in the Ginaca from time to time, basically the same machine is in use in the pineapple canning industry today and invariably is used whenever pineapples are processed for producing the slices, chunks and tidbits of the solid pack. The lead machine in the conventional processing line, line, the Ginaca in one continuous operation sizes a pineapple by making a cylindrical cut to remove the shell and leave a fruit cylinder, cuts off the butt and crown at the ends of the cylinder, cuts out the core and finally discharges the cylinder for further processing. Conventionally, the further processing involves first inspection and hand trimming of the fruit cylinders to remove eyes, skin traces or other surface imperfections, followed by slicing of the cylinders into slices of predetermined thickness by a gang cutter which slices a pineapple in its entirety in a single sweep. Thereafter, the slices are inspected and sorted according to quality and those suitable for the fancy, choice and standard grades of the solid pack are loaded into cans, usually by hand. The remaining, so-called salvage slices, in their turn, are consigned to the less profitable crushed and juice packs.

A Ginaca is effective in sizing, end-cutting and coring a pineapple, but is one of the most expensive individual machines used by the entire fruit canning industry and the conventional process entails more hand work than does the industrial canning of any other kind of fruit. For lack of anything better, the conventional processing line has heretofore been employed in recovering fruit for the solid pack from larger pineapples, but the expensiveness of the facilities, to say nothing of that of the necessary labor, have practically barred its use in recovering solid pack fruit from small pineapples weighing less than 2½ lbs. Consequently, even though small fruit usually has the tenderest meat, generally can produce 1T size slices and represents a substantial part of the yearly crop, it is now processed for the least profitable of the packs, the juice pack, with corresponding loss to the industry.

As opposed to the conventional process, it has now been found possible to process pineapples for the solid pack without using a Ginaca and so economically as to make it commercially practicable to recover meat for the solid pack from small as well as larger fruit. The new process is the invention described at length and claimed in the parent application, Ser. No. 141,680. The present invention is directed to sizing apparatus particularly suited for use in such a process.

An object of the present invention is to provide in pineapple processing apparatus an improved sizing apparatus combining a sizing knife and feed therefor, whereby pineapples can be sized efficiently and more economically than heretofore.

Another object of the invention is to provide apparatus for sizing pineapples with or without incident shell eradication but without incident end cutting or coring.

A further object of the invention is to provide in pineapple sizing apparatus a simple yet effective feed for feeding pineapples to and through a rotary tubular sizing knife.

Other objects and advantages of the invention will appear hereinafter in the detailed description, be particularly pointed out in the appended claims and be illustrated in the accompanying drawings, in which:

FIGURE 2 is a side elevational view of the apparatus of FIGURE 1;

FIGURE 3 is a fragmentary end elevational view of the feed end of the apparatus of FIGURE 2;

FIGURE 4 is a vertical sectional view taken along lines 4—4 of FIGURE 3;

Figure 1:
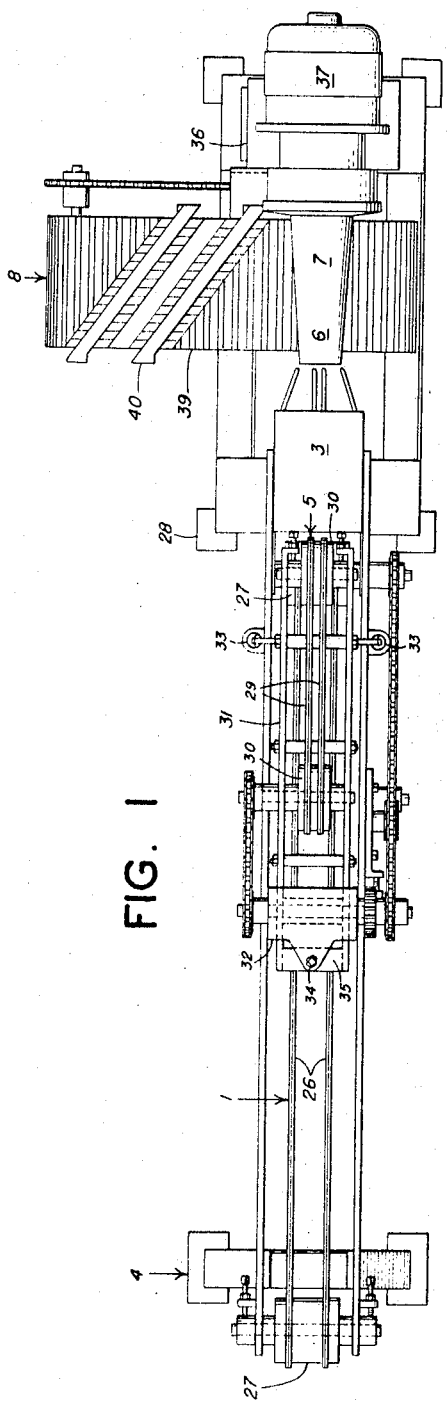
FIGURE 1 is a plan view of a preferred embodiment of the sizing apparatus of this invention.
Figure 5:
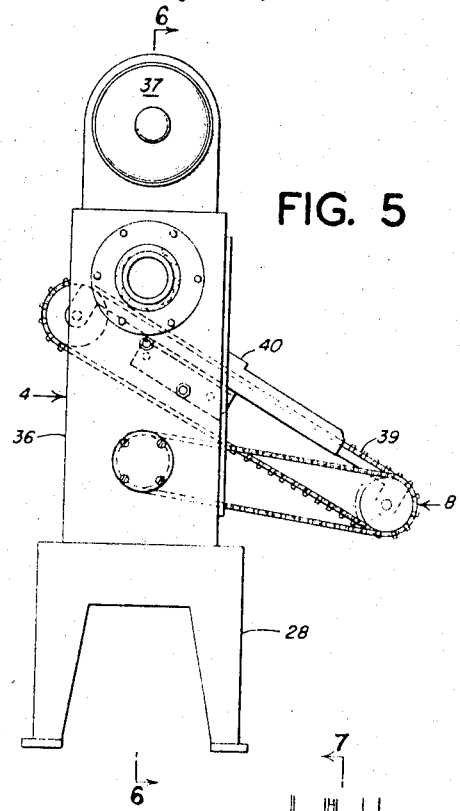
FIGURE 5 is an end elevational view taken from the discharge end of the sizing apparatus of FIGURE 2.
Figure 7:
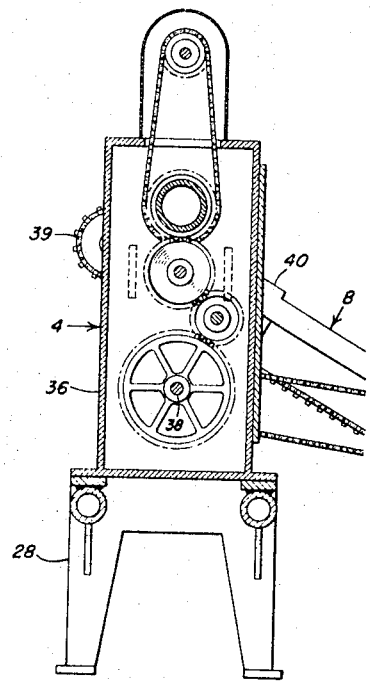
FIGURE 7 is a vertical sectional view on the scale of FIGURE 6 taken along lines 7—7 of FIGURE 6.
Figure 6:
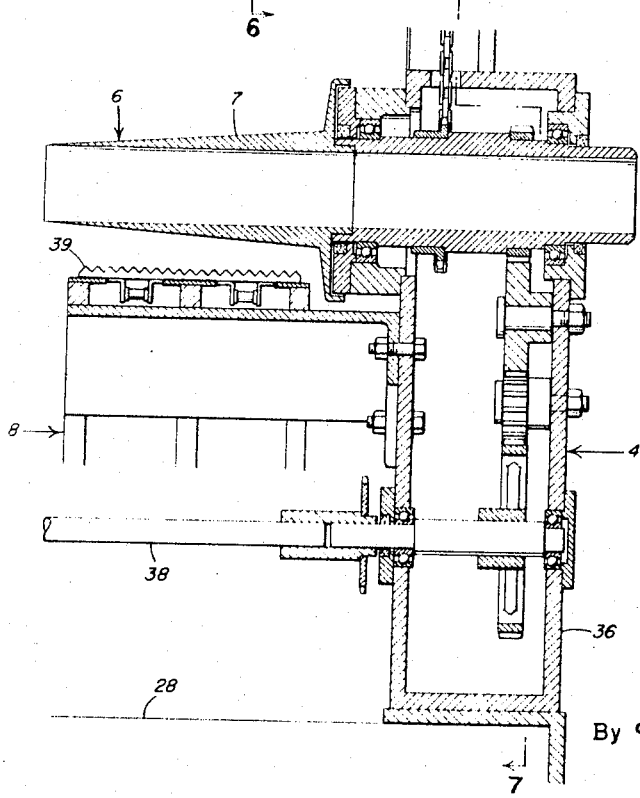
FIGURE 6 is a vertical sectional view on an enlarged scale taken along lines 6—6 of FIGURE 5.

Referring now in detail to the drawings in which like reference characters designate like parts, the sizing operation adapted to be performed by the improved sizing apparatus of this invention, is not the conventional sizing on a Ginaca machine followed in the machine's operating cycle by butt and crown or end cutting and by coring, but simply the making of a cylindrical cut to remove the shell and leave a fruit cylinder with its ends and core intact. The sizing operation may be and preferably is accompanied by eradication of the meat from the shell for use in the crushed and juice packs. However, even with this addition, the operation is readily performable on a machine that is much simpler and less expensive than a Ginaca machine and requires no complicated mechanism for feeding pineapples for sizing such as is necessitated by the Ginaca's cyclical operation. The succeeding slicing operation in the process of application Ser. No. 141,680 is not the conventional gang cutting of an end cut and cored fruit cylinder but the cutting of slices from a cylinder which at the time of cutting has its core and preferably also its butt and crown ends intact. The last of the essential steps of the process, the coring, is performed on slices and, while in all cases the cores will be severed or cut from the surrounding ring of meat to form the familiar annular slices, the stage at which the fruit is cored enables the cores either to be removed or to be canned as a novelty item with the remaining meat.

Intended for placement at the head or start of a processing line, such as described in my application Ser. No. 141,680, the improved sizing apparatus of this invention has as part of its feed a feed conveyor 1. In this preferred form, this conveyor is simply a pair of transversely spaced parallel endless V-belts 26 riding at opposite ends of the conveyor over grooved pulleys or rollers 27, one of which, here that at the rear, is a driven pulley and the other an idler adjustable to take up slack. Both of the pulleys conveniently are mounted on a suitable supporting stand 28 and the spacing between the belts is such as to accommodate or receive endwise and support in line or against lateral displacement pineapples of the particular size group the processing line as a whole is designed to treat. Centered vertically on the feed conveyor, the cooperating or coacting, overlying spring-urged or loaded belt 5 in its preferred form actually is a pair of V-belts 29 of less transverse spacing than those of the feed conveyor but also riding over a pair of longitudinally spaced grooved pulleys or rollers 30, one driven and the other an idler, the drive pulleys of the feed conveyor 1 and overlying or pressure belt 5 being drivably connected so that their adjoining flights move in the same direction at the same linear speed.

The downward force or pressure by which the pineapples are enabled to be gripped between and positively driven by the several belts is derived from mounting the pulleys 30 of the pressure belt 5 on a frame 31 swingable in vertical alignment with the feed conveyor and swingably mounted adjacent its front end and forwardly of the pulleys on an upright 32 upstanding from the stand 28 intermediate the ends of the feed conveyor and connecting the frame between the pulleys to the stand by a coil or other suitable tension spring 33. Downward swinging of the frame 31 under the combined force of gravity and the tension spring 33 in turn is limited by a bolt or like adjustable stop 34 mounted on the upright 32 and engageable with an underlying abutment 35 on the frame 31 forwardly of the latter's pivot. With the contiguous flights of the belts of the pressure belt and feed conveyor arranged to run substantially parallel, as well as in the same direction, in gripping a pineapple and the adjustment of the stop 34 such that it limits the downward swinging of the frame 31 only in the absence of a pineapple, the pressure belt not only assists the feed conveyor in driving pineapples along the line but enables the several belts to grip a pineapple with substantially uniform force during the period in which it is passing therebetween.

Since, like the flighted feed conveyor of a Ginaca machine, the feed conveyor 1 and pressure belt 5 are capable of centering pineapples generally but not exactly on the sizing knife 6 of the sizing machine 4, the exactness required in the sizing is performed by an intervening centering head 3 of conventional type which conveniently is mounted on the stand 28. The feed conveyor and pressure belt both terminate at the centering head and lose direct contact with a pineapple as it passes into the head. On a single pineapple they thus would be ineffective, since the momentum they could apply would hardly suffice to push the pineapple through the sizing knife. However, once a train of pineapples in end contact is established between the feed conveyor and pressure belt on the one hand and the sizing knife on the other, and such a train will always build up, regardless of how haphazardly or irregularly pineapples are fed to the conveyor, but stoppage of the leading pineapple as it contacts the knife, the pressure of the conveyor and belt on succeeding pineapples, exerted through the train, will positively push each pineapple into and through the sizing knife.

The sizing machine 4 to which the pineapples undergoing processing are fed for sizing through the centering head 3 is incomparably simpler than a Ginaca machine. The main element, the rotary tubular sizing knife 6, is similar to that of a Ginaca in having a through axial cylindrical bore or throat (not shown) of a diameter suitable for the particular group of pineapples being processed and a frusto-conical, forwardly tapered outer surface 7 over its front portion to split the shells as they are cut from the fruit. In the preferred machine, the sizing knife is mounted for rotation about a substantially horizontal axis in a housing 36 which also mounts the shell eradicator 8 and is surmounted by a drive motor 37. The housing in turn is mounted or supported on a part of the stand 28 which is made integral or rigid with the balance to facilitate alignment of the sizing knife and centering head.

In the preferred arrangement, the motor 37 not only drives the sizing knife 6 but, through a suitable drive connection (not shown) in the housing 36, also drives a take-off or drive shaft 38 which in turn, through appropriate connections, drives the feed conveyor 1 and the pressure belt 5, as well as the shell eradicator 8. The last element, the shell eradicator, is conventional in having a ribbed or slotted belt 39 onto which the split shells drops, meat side up, and a slitting and cutting device 40 for cutting the meat from the skin in a form usable as chunks or in the crushed pack, depending on its size and quality. As mentioned in describing the process of application Ser. No. 141,680, the sizing machine 4 is not designed to perform any operations on the fruit other than sizing and, preferably, shell eradication and discharges the fruit as fruit cylinders with their butt and crown ends and cores intact.

From the above detailed description it will be apparent that there has been provided a simple and effective apparatus for sizing pineapples. It should be understood that the described and disclosed embodiment is merely exemplary of the invention and that all modifications are intended to be included that do not depart from the spirit of the invention and the scope of the appended claims.

I claim:

1. In apparatus for processing pineapples, the combination of a stand, a rotary tubular sizing knife mounted on said stand for rotation about a substantially horizontal axis, a feed conveyor centered laterally on said knife and including a pair of endless V-belts spaced transversely for supporting pineapples therebetween and feeding said pineapples toward said knife, means rigid with and upstanding from said stand intermediate longitudinal extremities of said feed conveyor, a frame swingably mounted adjacent a front end thereof on said upstanding means for swinging in substantial vertical alignment with said conveyor, a second pair of transversely spaced endless V-belts carried by said frame rearwardly of said upstanding means and centered laterally on and of less transverse spacing than said conveyor belts, spring means acting between a rear portion of said frame and said stand for urging said pairs of belts toward each other, and means for driving said pairs of belts in synchronism, said pairs of belts being substantially coterminous rearwardly and cooperating for gripping and positively feeding pineapples through said sizing knife.

2. In apparatus for processing pineapples, the combination of a rotary tubular sizing knife rotatable about a substantially horizontal axis, a feed conveyor including a pair of transversely spaced endless V-belts running in longitudinal alignment with said knife for supporting and feeding pineapples theretoward, and a second pair of transversely spaced endless V-belts swingably mounted above a rear portion of and substantially coterminous rearwardly with said first pair and spring-urged downwardly theretoward, said second pair of belts being centered laterally on and cooperating with said first pair for gripping and positively feeding pineapples through said sizing knife.

3. In apparatus for processing pineapples, the combination of a stand, a rotary tubular sizing knife rotatably mounted on said stand for sizing pineapples into fruit cylinders, a shell eradicator underlying a front portion of said knife for eradicating meat from shells cut from said cylinders, a pair of endless V-belts mounted on said stand in advance of and in longitudinal alignment with said knife and transversely spaced for supporting and feeding pineapples toward said knife, a second pair of endless V-belts swingably mounted on said stand above a rear portion of and substantially coterminous rearwardly with said first pair, spring means acting between said second pair of belts and said stand for urging said pairs toward each other, and a motor mounted on said stand and drivably connected to said knife, shell eradicator and belts, said belts on drive by said motor cooperating to grip and positively feed pineapples through said knife.

4. In apparatus for processing pineapples, the combination of a rotary tubular sizing knife, a feed conveyor having at least an outlet portion aligned longitudinally with said knife, said conveyor including a pair of laterally spaced endless belts for supporting therebetween and feeding pineapples endwise toward said knife, endless belt means spaced rearwardly from an inlet end and overlying and vertically aligned with said outlet portion of and synchronized in drive with said conveyor, said conveyor and belt means cooperating for gripping and substantially centering said pineapples on said knife and positively feeding said pineapples therethrough.

References Cited

UNITED STATES PATENTS

| | | | |
|---|---|---|---|
| 752,929 | 2/1904 | Shelley | 146—73 X |
| 2,666,465 | 1/1954 | Beeken | 146—4 X |
| 2,787,273 | 4/1957 | Kerr | 146—4 X |
| 1,108,163 | 8/1914 | Frick | 146—110 |
| 1,415,458 | 5/1922 | Lewis | 146—6 |
| 2,486,367 | 10/1949 | Abrex et al. | 146—6 |
| 2,765,829 | 10/1956 | DeBack et al. | 146—6 |

W. GRAYDON ABERCROMBIE, *Primary Examiner.*

U.S. Cl. X.R.

146—110, 224